June 12, 1956 P. M. LA HUE 2,750,556

PHASE ADVANCING CONDITION SENSING APPARATUS

Filed March 8, 1955

INVENTOR.
PHILIP M. LAHUE

BY Frederick E. Lange

ATTORNEY

United States Patent Office 2,750,556

Patented June 12, 1956

2,750,556

PHASE ADVANCING CONDITION SENSING APPARATUS

Philip M. La Hue, St. Paul, Minn., assignor to Minneapolis-Honeywell Regulator Company, Minneapolis, Minn., a corporation of Delaware Application March 8, 1955, Serial No. 493,017

15 Claims. (Cl. 323—123)

This invention relates generally to condition sensing apparatus such as an apparatus for controlling a device in accordance with a controlling signal. It is more particularly related to control apparatus wherein an alternating signal, such as an alternating current carrier wave modulated by an error signal, is used as a means to indicate an error or change in a condition, and it is desirable to provide a phase shift in the modulating wave without shifting the phase of the alternating carrier wave so as to improve the stability of the apparatus.

The application of an alternating current phase shifting device is well known in the art. However, the methods used in the prior art are limited in application because of complexity or range of operation. One of the devices used to provide a phase shift on an alternating current signal of this type is a device which first demodulates the signal, provides a phase shift through the use of an R-C lead or lag network, and then remodulates to the carrier wave frequency. It is easily seen that this type of device has the limitation of having a large number of components included in its circuit. Another method used, is known as a precision frequency alternating current phase shift network. This method is limited to use on devices wherein a precision frequency signal is available.

In the present invention I have overcome the limitations found in the prior art. That is, I have invented a device which utilizes a minimum of components and, at the same time, is capable of operation over a relatively large range of frequency variation.

It is therefore an object of the present invention to provide a simple, inexpensive, phase shifting device.

It is another object of my invention to provide a device which will shift the phase of the modulating wave of a modulated alternating current carrier signal with negligible shift in the phase of the carrier wave.

It is a further object of my invention to provide a device which will shift the phase of the modulating wave of a modulated alternating current carrier signal which is operative over a wide range of frequency variation of the modulating wave.

It is a further object of my invention to provide a device which will shift the phase of the modulating wave of a modulated alternating current carrier signal which is operative over a wide range of frequency variation of the carrier signal of the modulating wave.

It is another object of my invention to provide an alternating current phase shifting device adapted to provide a phase lead.

It is a still further object of my invention to provide an alternating current phase shifting device adapted to provide a phase lag.

Other objects of the invention will be apparent from the following description taken in conjunction with the accompanying drawing in which.

Figure 1:
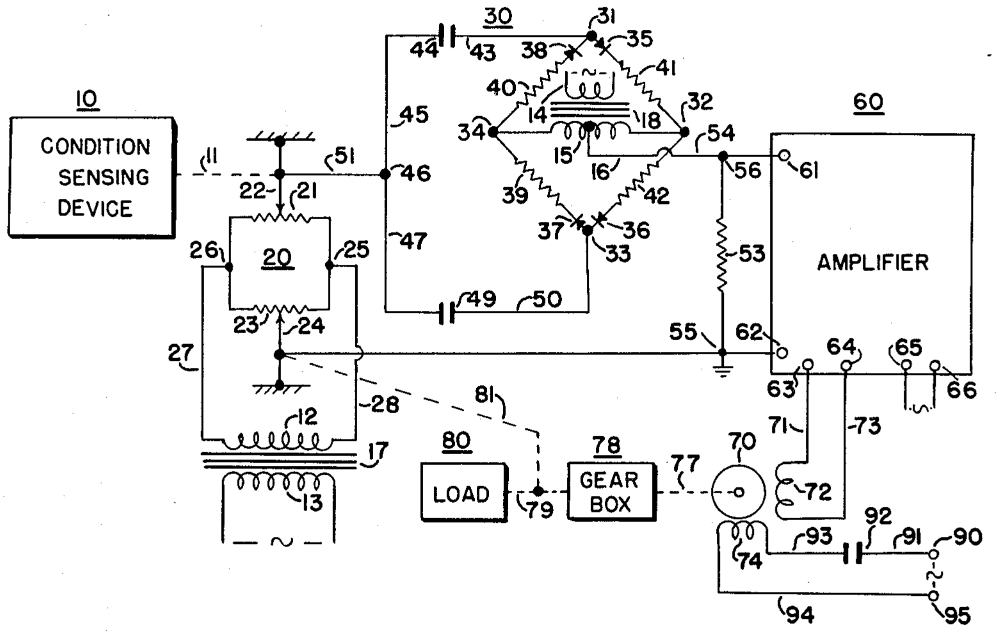
Figure 1 illustrates a condition sensing device utilizing my invention.

In Figure 1 of the drawing, I have shown a condition sensing device 10 operatively connected to alternating current bridge 20. The output of bridge 20 is connected to phase shifting device 30, the output of which is connected to amplifier 60. A motor 70 is connected to the output of amplifier 60 and to gear box 78, load 80 and bridge 20.

Bridge 20 comprises potentiometer 21 having a wiper 22 and potentiometer 23 having a wiper 24. Bridge 20 is energized from transformer 17 having a primary winding 13, and a secondary winding 12. Secondary winding 12 is connected to bridge 20 through lead 27 and terminal 26, and lead 28 and terminal 25. Wiper 22 on potentiometer 21 is adjusted in accordance with the output of condition sensing device 10 through connecting means 11. Wiper 24 of potentiometer 23 is connected to the output of gear box 78 through connecting means 81 and serves as a means to rebalance bridge 20.

Phase shifting device 30, shown for the purpose of illustration as a device for supplying a phase lead, comprises: a pair of input terminals shown as terminal 46 and wiper 24 on potentiometer 23; a pair of output terminals shown as terminals 55 and 56; a pair of capacitors 44 and 49; a ring circuit comprising terminal 32, resistor 42, asymmetrical current conducting device 36, terminal 33, asymmetrical current conducting device 37, resistor 39, terminal 34, resistor 40, asymmetrical current conducting device 38, terminal 31, asymmetrical current conducting device 35 and resistor 41; and a resistor 53 connected across terminals 55 and 56. The ring circuit is energized from transformer 18 having primary winding 14 and center tapped secondary winding 15. Secondary winding 15 is connected across the diagonally opposite terminals 32 and 34. Center tap 16 of secondary winding 15 is connected to output terminal 56 through lead 54. Capacitor 44 is connected from input terminal 46 through lead 45, capacitor 44 and lead 43 to ring terminal 31. Capacitor 49 is connected from input terminal 46 through lead 47, capacitor 49 and lead 50 to ring terminal 33.

Amplifier 60 is shown having input terminals 61 and 62 and output terminals 63 and 64. Terminals 65 and 66 are adapted to be connected to a suitable source of alternating current. Motor 70 is shown having coil 72 connected to amplifier 60 through terminal 63, lead 71, coil 72, lead 73, and terminal 64. Coil 74 on motor 70 is shown connected to a suitable source of alternating current through terminal 90, lead 91, capacitor 92, lead 93, coil 74, lead 94, and terminal 95. The output of motor 70 is connected to gear box 78 through driving means 77. Gear box 78 is operatively connected to load 80 through driving means 79. The output of gear box 78 is also connected to wiper 24 and potentiometer 23 through driving means 81.

Primary winding 13 of transformer 17, primary winding 14, of transformer 18, terminals 65 and 66 of amplifier 60 and terminals 90 and 95 of motor 70 are connected to a common source of alternating voltage (not shown).

Turning now to the operation of Figure 1, wherein I have shown my invention embodied in a condition sensing apparatus. It may be assumed, for the purposes of illustration, that the condition which is being sensed is varying in a sinusoidal manner and has a constant amplitude and, that the load 80 is an indicator used to indicate instantaneously the condition under observation. It is easily seen that the use of my invention is not limited to such a system but may be used in any system or by itself in a place where it is desirable to provide a phase shift on a modulated carrier wave signal. An illustration of such a use might be found in any control system wherein a signal of the type above described is used as a means for indicating a change in condition and it is desirable to improve the stability of the system, and is equally applicable where the modulating wave is a decaying or rising transient instead of a constant amplitude sinusoidal variation. The operation of Figure 1 is as follows: condition sensing device 10 senses the assumed sinusoidal signal and causes wiper 22 on potentiometer 21 to vary in a sinusoidal manner. Bridge 20 being energized with an alternating voltage, will have an output of the frequency of the bridge excitation voltage or carrier wave and an amplitude which varies with the output of condition sensing device 10. This output signal is analogous to a modulated carrier wave, double side band, suppressed carrier in which the modulating envelope of the wave is proportional to the output of condition sensing device 10. The output of bridge 20 then passes through phase shifting device 30 (shown as a device to provide a phase lead) to provide a phase shift of the modulating wave as explained below. The signal with its modulating wave shifted is amplified in amplifier 60 and is applied to motor 70. Motor 70 is operable to drive load 80 through gear box 78, in one direction or the other dependent upon the phase of the amplifier output signal, and at a rate proportional to the magnitude of the output signal. The output of gear box 78 is also connected to wiper 24 on potentiometer 23 so as to rebalance bridge 20. The operation of Figure 1 is further illustrated by the curves appearing in Figures 3 and 4 as will be explained below under the operation of Figure 2.

The following is a table of values which were used in one embodiment of my invention:

| Reference character: | Value |
|---|---|
| **35** | 1N138A silicon diode. |
| **36** | 1N138A silicon diode. |
| **37** | 1N138A silicon diode. |
| **38** | 1N138A silicon diode. |
| **39** | 10,000 ohms. |
| **40** | 10,000 ohms. |
| **41** | 10,000 ohms. |
| **42** | 10,000 ohms. |
| **44** | .85 microfarad. |
| **49** | .85 microfarad. |
| **53** | 10,000 ohms. |

Figure 2:
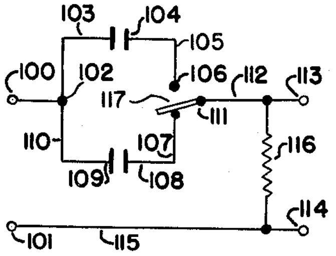
Figure 2 illustrates, for the purposes of explaining the operation of my invention, a simplified version of my invention.

Referring now to Figure 2, I have shown, for the purpose of explaining the theory of operation of my device, a simplified schematic diagram of my device adapted to provide a phase lead. The device shown comprises: input terminals 100 and 101; output terminals 113 and 114; lead 115 connecting input terminal 101 and output terminal 114; resistor 116 connected across terminals 113 and 114; and a synchronous switch 117, shown connecting output terminal 113 to input terminal 100 through lead 112, terminal 111, terminal 107, lead 108, capacitor 109, lead 110 and terminal 102. Synchronous switching device 117 may also connect input terminal 100 to output terminal 113 through lead 112, terminal 111, terminal 106, lead 105, capacitor 104, lead 103 and terminal 102. Synchronous switching device 117, shown in the form of a simple switch, is analogous in operation to the ring circuit shown in Figure 1 in that it accomplishes the desired operational characteristics of alternately placing one or the other of the two capacitors in circuit in synchronism with the frequency of the carrier wave.

Figure 3:
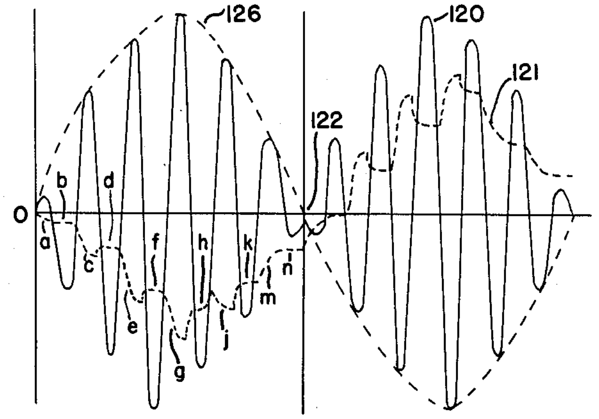
Figures 3 and 4 are illustrative of the wave forms appearing in various portions of Figure 2.
Figure 4:
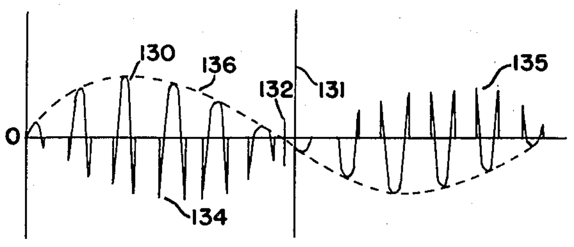

Figures 3 and 4 illustrate the wave forms appearing at various points in Figure 2 or analogous points in Figure 1. Curve 120 on Figure 3 shows an alternating current carrier wave, modulated by a constant amplitude sine wave, which is reversing in phate at a point which I have designated by the reference character 122. Curve 121, Figure 3, represents the voltage appearing across capacitor 104. Curve 130 on Figure 4 illustrates the output of my device appearing across resistor 116, due to the action of capacitor 104 on alternate half cycles of the input signal. The sharp pips designated by reference characters 134 and 135 constitute a certain amount of unobjectionable noise which is explained below. The line on Figure 4 designated by reference character 132 shows the phase lead or point of phase reversal of the modulating wave after it has been phase shifted, due to the action of my invention with respect to the phase reversal of the original signal as shown by line 131. Curve 126 on Figure 3 and curve 136 on Figure 4 serve to illustrate the modulating wave before and after its phase has been shifted.

Turning now to the operation of Figure 2 it will be assumed that the signal I have shown as curve 120 on Figure 3 is to be operated upon by the device I have shown in Figure 2, to provide a phase shift of the modulating wave. Synchronous switch 117 is assumed to be operating as a single pole double throw synchronous switch having instantaneous switching time in which one contact opens as the other contact closes, at the frequency of the carrier wave so that for alternate half cycles capacitor 104 is connected in circuit and for the other alternate half cycle capacitor 109 is connected in circuit. It is sufficient to consider the voltage appearing across capacitor 104 only and this is illustrated by curve 121 on Figure 3. We can further assume that for the portion of the signal to the left of the phase reversal point 122, capacitor 104 is connected in circuit during the positive half cycles and during the portion of the signal occurring after phase reversal capacitor 104 is connected in circuit during the negative half cycles of the signal. On the first positive half cycle of the signal, the capacitor 104 charges through resistor 116 to a value determined by the time constant of resistor 116 and capacitor 104 as indicated by reference character *a* on Figure 3. At the instant the signal crosses the zero axis, capacitor 104 is disconnected and capacitor 109 is connected. Capacitor 104 being disconnected, the charge on it remains essentially constant during the negative half cycle, this is shown on *b* on Figure 3. On the next positive half cycle of the signal, capacitor 104 is again connected to resistor 116, but current does not flow through resistor 116 until the amplitude of the signal exceeds the charge on capacitor 104 as illustrated by reference character *c*. On the next half cycle when the signal again goes negative, capacitor 104 is disconnected from resistor 116 and the charge on capacitor 104 remains at some constant value indicated as *d*. Therefore it is seen that as the amplitude of the modulated signal increases, capacitor 104 charges to increasingly higher voltages while retarding the current flow through resistor 116 shown as *a, c, e,* and *g* on Figure 3. As the modulated carrier signal decreases, the charge on capacitor 104 will at some time exceed the signal amplitude and capacitor 104 will therefore be discharging through resistor 116 in a direction opposite to that of the signal as indicated by *m* on Figure 3. This causes the output voltage appearing across resistor 116 to reverse polarity before the signal itself has reversed polarity and provides the desired phase shift. Curve 130 in Figure 4 illustrates the output voltage appearing across resistor 116 due to the described action of capacitor 104 and the signal voltage.

The sharp pips indicated by reference characters 134 and 135 on Figure 4, result from a discharge from capacitor 104 through resistor 116 during a short time interval at the beginning and end of each half cycle that capacitor 104 is connected in circuit. This is caused by the fact that at such times, the charge on the capacitor exceeds the value of the signal voltage, and during this short time capacitor 104 discharges through resistor 116 producing a voltage in a direction opposite to that which would be produced by the signal alone. Since the time base of curve 136 on Figure 4 is equal to the time base of curve 126 on Figure 3, the phase shift is shown on Figure 4 as the distance between the line 132, the point of phase reversal on the output wave form, and line 131, the point of phase reversal on the signal.

Capacitor 109 may be seen to have the same effect on the signal as capacitor 104 except that it is operative on the other alternate half cycles of the signal. The resultant output of the device shown in Figure 2. The output of the device shown as phase shifting device 30 on Figure 1 is exactly the same, and consists of the same carrier wave frequency with the phase of the modulating wave advanced by an amount determined by the value of the circuit components.

The operation of the ring circuit shown in Figure 1 is as follows: assuming the left-hand extremity of secondary winding 15 of transformer 18 is negative and the right-hand extremity is positive, it is seen that asymmetrical current conducting devices 36 and 37 are biased to conduction and current will flow in a circuit from the right-hand extremity of transformer secondary winding 15 through terminal 32, resistor 42, asymmetrical current conducting device 36, terminal 33, asymmetrical current conducting device 37, resistor 39, and terminal 34 and to the left-hand extremity of secondary winding 15. At the same time, asymmetrical current conducting devices 35 and 38 are biased to a nonconducting state to prevent conduction through the upper half of the ring. Assuming that at this time the incoming signal current flowing through resistor 53 on Figure 1 to center tap 16 of secondary winding 15 is positive with respect to terminal 46, the current flow of the signal will then divide symmetrically between the parallel paths from center tap 16 on secondary winding 15 to terminal 32 through resistor 42, asymmetrical current conducting device 36, to terminal 33, and from center tap 16 on secondary winding 15 to terminal 34, through resistor 39 and asymmetrical current conducting device 37, to terminal 33. At terminal 33 the currents flow to lead 50, capacitor 49, lead 47 to terminal 46. It will be realized that since the asymmetrical current conducting devices 36 and 37 are already biased to current conduction, the signal current does not actually flow in a reverse direction but merely increases the current in one-half and reduces it in the other. On the other half cycle, the polarities on secondary winding 15 are reversed and terminal 34 becomes positive and terminal 32 becomes negative. Now the top half of the ring is biased conductive and the lower half is biased nonconducting, thereby providing a path for current to flow to capacitor 44. Since transformer 18 is energized from the same source of alternating current as bridge 20, the ring circuit will operate as a synchronous switching device or gate thereby allowing conduction to capacitor 44 or capacitor 49 alternately in sychronism with the incoming carrier wave signal. It is readily apparent that it is necessary that the reference or gating voltage applied to the ring circuit, be several times greater than the maximum magnitude of the incoming carrier wave signal. It is to be noted then, that the action of the ring circuit in Figure 1 is the same as the synchronous switch shown in Figure 2, and that the operation of phase shifting device 30 in Figure 1 is analogous to the operation of the circuit shown in Figure 2.

It will be understood that modifications may be made on the design and arrangement of the parts without departing from the spirit of the invention.

What is claimed is:

1. Condition control apparatus comprising; means supplying an alternating signal of variable magnitude and reversible phase; output means operable in response to said signal for maintaining a desired operating condition; an alternating current phase shifting device acting upon said signal so as to provide a phase shift comprising, a pair of capacitors, four asymmetrical current conducting devices connected as to form a ring, resistance means connected in series with each of said asymmetrical current conducting devices, transformer means having a primary and a center tapped secondary winding, said center tapped secondary winding being connected to diagonally opposite terminals of said ring, said capacitors being connected to said signal source and to the other diagonally opposite terminals of said ring, and a load resistor connected from said center tap on said secondary winding to a common lead; means connecting said alternating signal to said phase shifting device; and amplifier means connected to said phase shifting device and to said output means.

2. Condition control apparatus comprising; a signal source; output means operable in response to said signal; an alternating current phase shifting device acting upon said signal so as to provide a phase shift comprising, a pair of phase shifting impedance elements, four asymmetrical current conducting devices connected as to form a ring, transformer means having a primary and a center tapped secondary winding, means connecting said center tapped secondary winding to diagonally opposite terminals of said ring, means connecting said phase shifting impedance elements to said signal source and to the other diagonally opposite terminals of said ring, and impedance means connecting said center tap on said secondary winding to a common lead; means connecting said signal source to said phase shifting device; and amplifier means connected to said phase shifting device and to said output means.

3. Condition control apparatus comprising; a signal source; output means; an alternating current phase shifting device acting upon said signal so as to provide a phase shift comprising, input terminals, output terminals, a pair of reactance elements, means for alternately connecting said reactance elements in circuit with an impedance means connected between said output terminals, means interconnecting one of said input terminals and one of said output terminals, and means connecting said signal source to said input terminals of said phase shifting device; and amplifier means connected to said output terminals of said phase shifting device and to said output means.

4. In control apparatus wherein it is desired to produce a phase shift of the modulating component of a modulated alternating carrier wave, a phase shifting circuit comprising; first and second input terminals; first and second output terminals; means connecting said second input terminal and said second output terminal to a common point; resistance means connected across said output terminals; four asymmetrical current connecting devices connected in a ring; transformer means having a primary winding energized from the source of said alternating carrier wave, and a center tapped secondary winding, the extremities of which are connected to a pair of diagonally opposite terminals of said ring, and means connecting said center tap to said first output terminal; and a pair of reactance means each connecting one of the other of the diagonally opposite terminals of said ring to the first of said input terminals.

5. In control apparatus wherein it is desired to produce a phase shift of the modulating component of a modulated alternating carrier signal, a phase shifting circuit comprising; first and second input terminals; first and second output terminals; means interconnecting said second input terminal and said second output terminal; impedance means connected across said output terminals; first and second capacitor means; means connecting one terminal of each of said capacitor means to said first input terminal; and switching means alternately connecting the other terminal of each of said capacitor means to said first output terminal in synchronism with said alternating carrier signal.

6. In control apparatus, a phase shifting device comprising; first and second input terminals; first and second output terminals; means interconnecting said second input terminal and said second output terminal; impedance means connected across said output terminals; and switching means connecting one or the other of a pair of impedance elements alternately between said first input terminal and said first output terminal.

7. An electrical phase shifting apparatus comprising; a pair of input terminals, A and B; a pair of output terminals, C and D; impedance means connected between said terminals C and D; means interconnecting said terminals B and D; four asymmetrical current conducting devices connected in a ring; transformer means, including a center tapped secondary winding having its extremities connected diagonally across one pair of terminals of said ring, means connecting said center tap to said terminal C; and a pair of impedance elements each connected between one of the other diagonally opposite terminals of said ring and said terminal A.

8. Phase shifting apparatus comprising; a source of alternating signal variable in magnitude and reversible in phase; a pair of input terminals; means connecting said input terminals to said signal source; a pair of output terminals; impedance means connected across said output terminals; means interconnecting one of said input terminals and one of said output terminals; and reactance means connected between the other of said input and output terminals comprising, a pair of reactors, and switching means alternately connecting said reactance means in circuit in accordance with the frequency of said signal.

9. Alternating current phase shifting apparatus comprising; a source of alternating signal, variable in magnitude and reversible in phase; a pair of input terminals; means connecting said input terminals to said signal source; a pair of output terminals; impedance means connected across said output terminals; means connecting one of said input and output terminals; and phase shifting impedance means connected between the other of said input and output terminals comprising, a pair of capacitors, and switching means alternately connecting said capacitors in circuit in accordance with the frequency of said signal.

10. Alternating current phase shifting apparatus comprising; a pair of input terminals; a pair of output terminals; impedance means connected across said output terminals; means interconnecting one of said input and output terminals; and means connected between the other of said input and output terminals comprising, a pair of reactance means, and switching means alternately connecting said reactance means in circuit in synchronism with the frequency of said signal.

11. Electrical phase shifting apparatus comprising; a pair of output terminals; a pair of input terminals; impedance means connected across said output terminals; means interconnecting one of said output and one of said input terminals; a pair of reactance elements having one terminal of each connected to the other of said input terminals; and means for alternately connecting the other terminal of each of said reactance elements to the other of said output terminals in a predetermined manner.

12. Electrical phase shifting apparatus comprising; a pair of output terminals; a pair of input terminals; impedance means connected across said output terminals; means interconnecting one of said output and one of said input terminals; a pair of impedance elements having one terminal of each connected to the other of said input terminals; and means for alternately connecting the other terminal of each of said impedance elements to the other of said output terminals in a predetermined manner.

13. Electrical apparatus for operating an a modulated carrier signal to produce a phase shift in the modulating wave comprising; a pair of input terminals; a pair of output terminals, means interconnecting one of each of said input and output terminals; impedance means connected between said output terminals; a pair of capacitors each having one terminal connected to the other of said input terminals; and a switching device for connecting the other terminal of said capacitors alternately in circuit with the other of said output terminals in synchronism with the carrier frequency of said modulated carrier wave signal.

14. Electrical apparatus for operating on a modulated carrier signal to produce a phase shift in the modulating wave comprising; a pair of input terminals; a pair of output terminals, means interconnecting one of each of said input and output terminals; impedance means connected between said output terminals; a pair of inductors each having one terminal connected to the other of said input terminals; and a switching device for connecting the other terminal of said inductors alternately in circuit with the other of said output terminals in synchronism with the carrier frequency of said modulated carrier wave signal.

15. Electrical apparatus for operating on a modulated carrier signal to produce a phase shift in the modulating wave comprising; a pair of input terminals; a pair of output terminals, means connecting one of each of said input and output terminals in common; impedance means connected between said output terminals; a pair of reactance means each having one terminal connected to the other of said input terminals; and a switching device for connecting the other terminal of said reactance means alternately in circuit with the other of said output terminals in synchronism with the carrier frequency of said modulated carrier wave signal.

No references cited.